J. McKECHNIE.
MOLDING OR LIKE APPARATUS.
APPLICATION FILED JUNE 4, 1919.
1,354,913.
Patented Oct. 5, 1920.
2 SHEETS—SHEET 1.
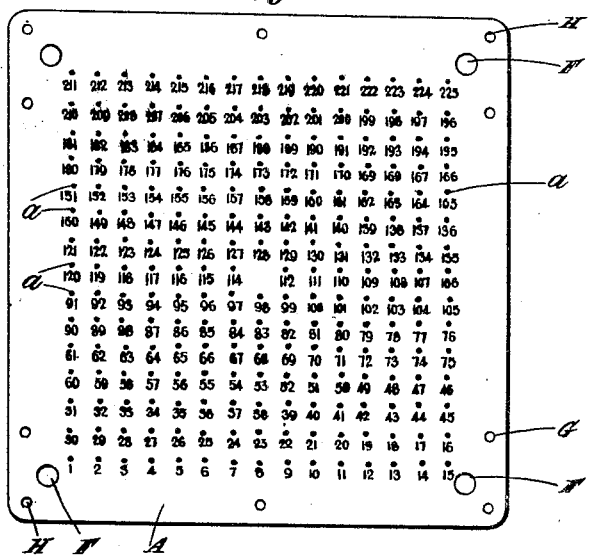
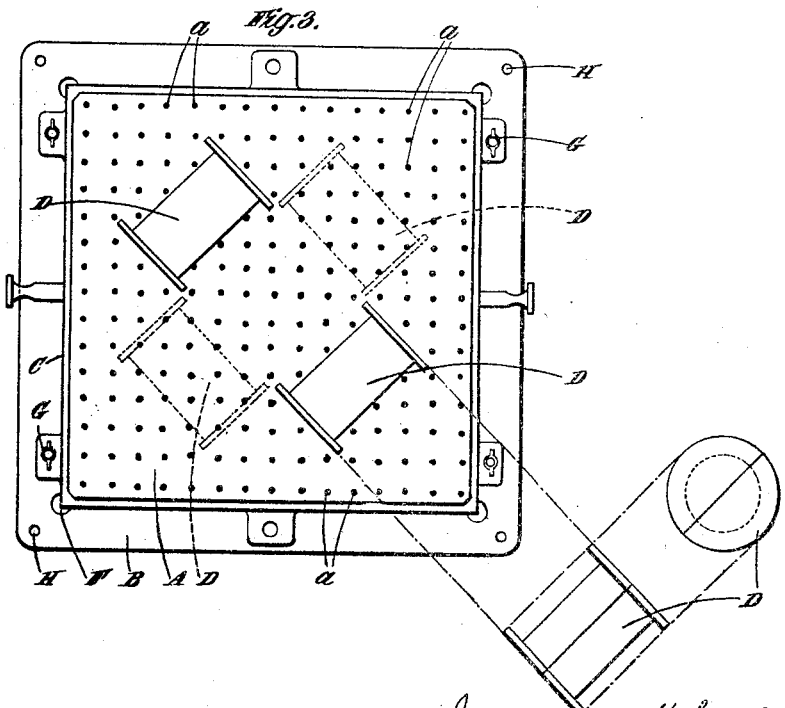

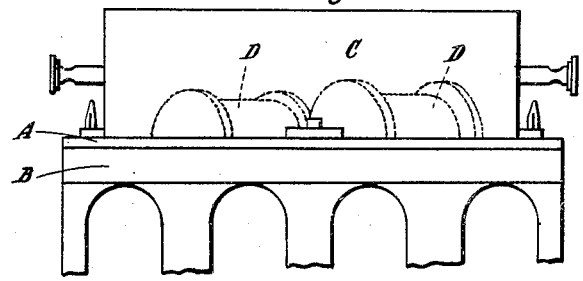
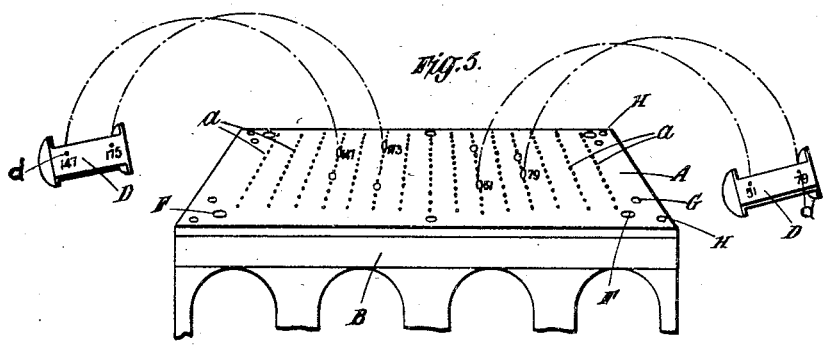
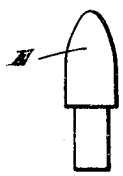
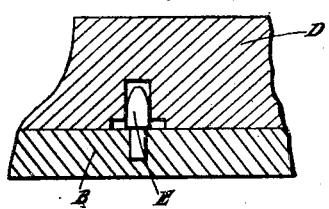
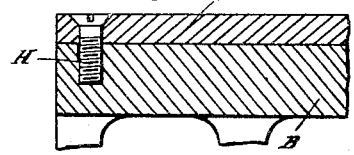
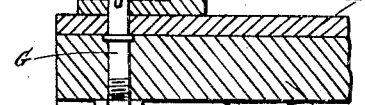
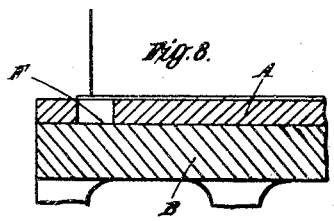

UNITED STATES PATENT OFFICE.

JAMES McKECHNIE, OF BARROW-IN-FURNESS, ENGLAND, ASSIGNOR TO VICKERS LIMITED, OF WESTMINSTER, ENGLAND.

MOLDING OR LIKE APPARATUS.

1,354,913.  Specification of Letters Patent.  Patented Oct. 5, 1920.

Application filed June 4, 1919. Serial No. 301,779.

*To all whom it may concern:*

Be it known that I, Sir JAMES McKECHNIE, K. B. E., a subject of the King of Great Britain, residing at Naval Construction Works, Barrow-in-Furness, in the county of Lancaster, England, have invented certain new and useful Improvements in or Relating to Molding or like Apparatus, of which the following is a specification.

This invention relates to molding machines the object being to render practicable the inexpensive machine molding of single or small numbers of articles.

According to the present invention there is provided a pattern plate corresponding in size to the maximum size of molding machine table to be dealt with together with a molding box which is also of maximum capacity, the parts of the pattern plate being provided with indexing means and being so constructed or arranged that any one or more of a variety of loose patterns can be attached as required at predetermined positions thereon. To this end the pattern plate, which, if desired, may be constituted by the table of the molding machine, is provided with means for indicating the correct position that each pattern is to occupy thereon, such as a series of openings or perforations, hereinafter termed dowel holes, the said dowel holes preferably having index numbers and being located at predetermined distances apart over the surface of the pattern plate. The patterns to be employed with the novel pattern plate may also be provided with means for indicating the correct position which they are to occupy on the pattern plate, such as two or more openings or dowel holes for receiving the dowel pins which secure the pattern in position on the pattern plate, so that by referring to the index numbers on the dowel holes of the pattern the correct position which each pattern is to occupy on the pattern plate will immediately be indicated.

In order that the said invention may be clearly understood and readily carried into practice the same will now be described more fully with reference to the accompanying drawing which shows one embodiment of the invention as applied to a molding machine having a detachable index or pattern plate constructed according to the invention and in which:—

Figure 1 is a plan view of the index or pattern plate.

Fig. 2 is an elevation thereof.

Fig. 3 is a plan view of the bed of the machine showing a pattern plate, a molding box and two half patterns in position, the index numbers being omitted from the pattern plate for the sake of clearness. In this figure the position which the two half patterns will occupy when reversed is indicated in dotted lines; the figures also show at the side thereof a projected view of the complete pattern.

Fig. 4 is an elevation of Fig. 3.

Fig. 5 is a perspective view of the bed of the molding machine with the pattern plate in position thereon. In this figure the two pattern halves have been illustrated in a partly inverted position above the pattern plate so as to show the dowel holes and index numbers on the lower faces thereof, while the corresponding dowel holes to which the pattern halves are to be secured are prominently indicated and numbered on the pattern plate, the other index numbers being omitted. In this figure the reverse position which the two pattern halves are to occupy are indicated by circles whose size has been exaggerated for the sake of clearly showing the same.

Fig. 6 is a detail view of part of the bed of the machine showing one of the chamfered holes and one of the screws which are provided in the pattern plate for holding the said plate in position.

Fig. 7 is a view showing one of the fastening devices which prevent the molding box from lifting during the jarring operation.

Figs. 8 and 10 are detail views of a bumping stop the use of which is hereinafter described.

Fig. 9 shows one of the dowel pins and

Fig. 11 is a section of part of the pattern plate and one of the patterns showing the dowel pin in position.

A is the aforesaid pattern or index plate, B is the bed of the molding machine, C is the molding box and D, D are two pattern halves which are shown in position on the index plate A. E is one of the said dowel pins, F is one of the bumping stops and G is the aforesaid fastening device for detachably connecting the molding box in position. H is one of the aforesaid screws which are situated in chamfered holes in the plate A for the purpose of holding the same in position. *a, a* are the dowel holes in the index plate A, which are situated at predetermined distances apart. As shown by way of example in Fig. 1 the holes *a* are numbered from 1 to 225; the various patterns which are to be used in conjunction with the aforesaid pattern plate being also provided with dowel holes *d, d*, bearing numbers which indicate to the workmen the corresponding openings which are positioned at the same distance apart on the index plate and over which they are to be located and secured in position by the dowel pins. The index plate may be of steel or of any other suitable material and the dowel holes *a* provided therein are preferably jig drilled to the required pitch, the holes being equally spaced apart over the entire area to be covered by the molding box. In constructing the patterns for use on the index plate the workmen in the pattern shop are provided with a duplicate of the index plate and the dowel holes in the pattern halves, after their correct position has been ascertained, for instance by a jig set, are drilled or otherwise formed to correspond to the numbered holes over which they are to be located on the pattern plate, the said location holes being numbered with the same reference numerals as those which are a corresponding distance apart on the index plate so as to indicate to the workmen in the foundry the correct position of each pattern half on the pattern plate. The dowel pins E which are provided for the purpose of detachably securing the pattern halves to the index plate A are preferably machine finished so that there may be no overlapping at the joint in the finished casting. The bumping stops F insure that when the two flasks or molding boxes are superimposed there will be no metallic contact between the flasks but a perfect joint of sand upon sand. In the example shown the pattern chosen corresponds in section to that of a plain pipe and in cases of this kind where each half of the pattern is identical, only one half pattern need be employed for each article, as the half patterns may be stamped with index numbers indicating the reverse position which they should occupy on the pattern plate. Two complete castings can thus be obtained from one complete pattern, *e. g.*, from the two half patterns shown at Figs. 3, 4 and 5.

Owing to the present invention the whole area of the pattern plate can be covered with a variety of different patterns with the assurance that both the half molds will exactly coincide at the junction line. As the patterns, irrespective of their shape or number, within the capacity of the machine are accurately located in position on the pattern plate by dowels or dowel holes bearing numbers according to those on the pattern plate of the molding machine, the numbers on the patterns being supplied or fixed by the pattern shop who arrange and fix the patterns to the reference plate. As the patterns are of ordinary construction no extra cost is involved in manufacturing the same so that a pattern can be made in the ordinary way and it may be molded by hand or machine as desired. Moreover, only one size of molding box corresponding to the maximum capacity of the molding machine is required as the molding box can be filled with as many patterns as can be conveniently jarred or rammed up. A considerable saving is thus effected in the cost of molding boxes while at the same time insuring that the molding machine will work at its maximum capacity.

It is to be understood that, as aforesaid, the bed or table of the molding machine may itself be used as an index plate by drilling suitable holes therein.

What I claim and desire to secure by Letters Patent of the United States is:—

1. A molding machine comprising a pattern plate, indexing means associated with said plate, and patterns for attachment in predetermined positions on said plate, said patterns having indicating means thereon for pointing out the correct position that any particular pattern is to occupy on said plate.

2. A molding machine comprising a pattern plate to which any one or more of a number of patterns can be detachably secured, a series of dowel holes located at predetermined distances apart on the surface of said plate, indicating means associated with said dowel holes, and patterns for attachment to said plate, also provided with indicating means which serve to indicate to the operator the correct position in which to locate the same on the said plate.

3. For use in a molding machine, a plate provided with means for attaching any one or more of a number of loose patterns thereto, the surface of the said plate being provided with indexing means for indicating the correct position that any particular pattern is to occupy thereon.

4. For use in a molding machine, a pattern plate corresponding to the maximum size of molding machine table to be dealt with and a molding box which is also of a maximum capacity, the pattern plate being provided with dowel holes spaced at predetermined distances apart, to which any one or more of a variety of loose patterns can be detachably secured, and indicating means associated with said dowel holes for pointing out the position that any particular pattern is to occupy on the pattern plate.

5. A method of accurately locating patterns in position on the pattern plate of a molding machine which consists in forming dowel holes over the entire surface of the pattern plate, said dowel holes being spaced at predetermined distances apart and provided with a series of consecutive numbers or indicia, providing a standard reference plate for use by the pattern makers corresponding to said pattern plate, determining, by means of said reference plate, the correct position that each pattern is to occupy on said pattern plate, and placing on said patterns references which indicate the correct position that each pattern is to occupy on the pattern plate, so that the operator at the molding machine, by referring to the references on the patterns, can determine the correct position which each pattern is to occupy on the pattern plate.

In testimony whereof, I affix my signature.

JAMES McKECHNIE.